US010975905B1

(12) United States Patent
Freed et al.

(10) Patent No.: US 10,975,905 B1
(45) Date of Patent: Apr. 13, 2021

(54) PACKING NUT LOCKING APPARATUS AND METHODS

(71) Applicant: FORUM US, INC., Houston, TX (US)

(72) Inventors: Wesley Freed, Aledo, TX (US); Ryan Payne, Granbury, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 16/676,217

(22) Filed: Nov. 6, 2019

(51) Int. Cl.
*F16B 39/10* (2006.01)
*F15B 15/26* (2006.01)

(52) U.S. Cl.
CPC .............. *F16B 39/10* (2013.01); *F15B 15/26* (2013.01)

(58) Field of Classification Search
CPC ...... F04B 53/007; F04B 53/147; F04B 53/16; F04B 53/22; F04B 53/02; F16B 39/10; F16B 39/103; F15B 15/26
USPC ...................... 411/94, 96, 99, 102
See application file for complete search history.

(56) References Cited

U.S. PATENT DOCUMENTS

| | | | |
|---|---|---|---|
| 2,574,648 A | 11/1951 | Mason | |
| 2,744,777 A | 5/1956 | Mucher | |
| 4,520,837 A | 6/1985 | Cole et al. | |
| 5,127,807 A | 7/1992 | Eslinger | |
| 5,419,538 A | 5/1995 | Nicholas et al. | |
| 6,171,070 B1 | 1/2001 | Mitake | |
| 7,350,832 B1 | 4/2008 | Kiely | |
| 8,402,880 B2 | 3/2013 | Patel et al. | |
| 8,529,230 B1 * | 9/2013 | Colley, III | ............... F16B 39/04 417/572 |
| 8,701,546 B2 | 4/2014 | Pacht | |
| 8,784,082 B2 * | 7/2014 | Leugemors | ............. F16B 39/10 417/572 |
| 9,157,468 B2 * | 10/2015 | Dille | ..................... F16B 39/103 |
| 2005/0201881 A1 | 9/2005 | Jensen et al. | |
| 2008/0116688 A1 | 5/2008 | Bull et al. | |
| 2010/0143163 A1 | 6/2010 | Patel et al. | |
| 2011/0142699 A1 | 6/2011 | Pacht | |
| 2011/0289753 A1 | 12/2011 | Leugemors et al. | |
| 2012/0164004 A1 | 6/2012 | Thomeer et al. | |

(Continued)

FOREIGN PATENT DOCUMENTS

| | | |
|---|---|---|
| DE | 1703966 A1 | 2/1972 |
| WO | 2017136044 A1 | 8/2017 |
| WO | 2017136045 A1 | 8/2017 |

OTHER PUBLICATIONS

Mark Nowell, The 5 Failures of Fluid Ends, Upstream Pumping, Oct. 18, 2016, available at https://www.upstreampumping.com/article/well-completion-stimulation/2016/5-failures-fluid-ends.

(Continued)

*Primary Examiner* — Thomas E Lazo
(74) *Attorney, Agent, or Firm* — Patterson & Sheridan, L.L.P.

(57) ABSTRACT

Aspects of the present disclosure relate to packing nut locking apparatus and methods for fluid ends, and associated components thereof. In one implementation a fluid end apparatus includes a fluid end body having an outer surface, and one or more stay rods disposed at least partially externally to the outer surface of the fluid end body. The fluid end also includes one or more packing nuts, and a lock assembly. The lock assembly includes a first block in contact with the one or more stay rods, and a second block in contact with the one or more packing nuts.

22 Claims, 6 Drawing Sheets

(56) References Cited

U.S. PATENT DOCUMENTS

| | | |
|---|---|---|
| 2013/0068092 A1 | 3/2013 | Marette |
| 2014/0271290 A1* | 9/2014 | Davis .................... F04B 53/143 |
| | | 417/437 |
| 2016/0108910 A1 | 4/2016 | Smith |
| 2017/0175799 A1* | 6/2017 | Arnold .................... F16B 39/10 |
| 2017/0204852 A1 | 7/2017 | Barnett, Jr. |
| 2017/0218993 A1 | 8/2017 | Freed et al. |

OTHER PUBLICATIONS

Heavy Duty Cam Handles, McMaster-Carr, accessed Jul. 16, 2019, available at www.mcmaster.com/cam-handles.
International Search Report and Written Opinion issued in International Application No. PCT/US2016/066598, dated Jun. 30, 2017.
International Search Report and Written Opinion issued in International Application No. PCT/US2016/066616, dated Mar. 15, 2017.
International Search Report and Written Opinion dated Jan. 27, 2021 for Application No. PCT/US2020/058157.

\* cited by examiner

PACKING NUT LOCKING APPARATUS AND METHODS

BACKGROUND

Field

The disclosure relates to packing nut locking apparatus and methods for fluid ends, and associated components thereof.

Description of the Related Art

Packing nuts are used in the oil and gas industry, such as on fluid ends. Operational problems can arise when the packing nuts back out during use. For example, backing out of a packing nut can cause premature failure of a fluid end by causing cracking in the fluid end. The probability or extent of such a failure can cause changes to be made to the fluid end that increase cost and complexity of the fluid end, and/or decrease reliability, ease of use, and/or modularity of the fluid end.

Therefore, there is a need for a fluid end that reduces or eliminates the risk and/or amount of backing out during use, and promotes reliability, cost-effectiveness, design simplicity, ease of use, and modularity of fluid ends.

SUMMARY

Aspects of the present disclosure relate to packing nut locking apparatus and methods for fluid ends, and associated components thereof.

In one implementation, a fluid end apparatus, includes a fluid end body having an outer surface, and one or more stay rods coupled to the fluid end body and disposed at least partially externally to the outer surface of the fluid end body. The fluid end apparatus also includes one or more packing nuts threadedly coupled to the fluid end body, and a lock assembly. The lock assembly includes a first block in contact with the one or more stay rods, and a second block in contact with the one or more packing nuts. The lock assembly also includes a connector rod actuatable to move at least one of the first or second blocks relative to the other of the first or second blocks and into contact with the one or more stay rods or the one or more packing nuts.

In one implementation, a fluid end apparatus includes a fluid end body having an outer surface, and one or more stay rods disposed at least partially externally to the outer surface of the fluid end body. The fluid end apparatus also includes one or more packing nuts, and a lock assembly. The lock assembly includes a first block, a second block, and a connector rod disposed at least partially between the first block and the second block. The connector rod is actuatable to apply a locking force to the one or more packing nuts.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to packing nut locking apparatus and methods for fluid ends, and associated components thereof.

Figure 1A:
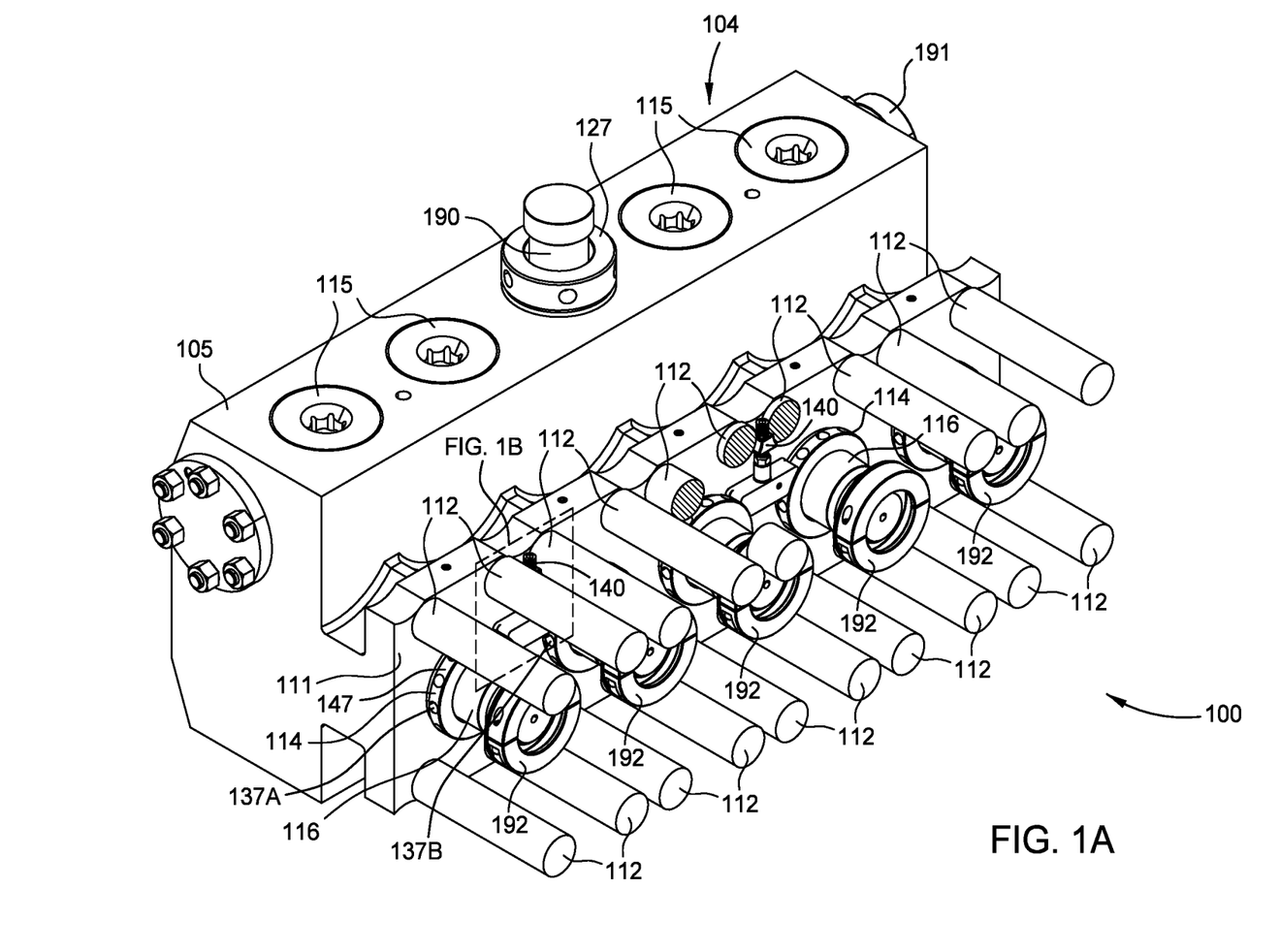
FIG. 1A is a schematic isometric view of a fluid end apparatus, according to one implementation.

FIG. 1A is a schematic isometric view of a fluid end apparatus 100, according to one implementation. The fluid end apparatus 100 includes a fluid end 104 having a fluid end body 105. The fluid end apparatus 100 is part of a pump that includes a power end opposing the fluid end 104. The pump may be a reciprocal pump for oil and gas operations, such as a frac pump, for example. The fluid end 104 is adapted to couple to the power end via a plurality of plungers 116. The fluid end 104 includes a plurality of retainer nuts 115 disposed at least partially in one of a plurality of bores formed in the fluid end body 105. A gauge connector 190 may be coupled to a bore of the fluid end body 105 by a gauge connector nut 127. A discharge flange 191 may be coupled to opposing ends of the fluid end body 105 for connecting hoses with a discharge manifold. A plurality of plunger clamps 192 may be disposed between the plungers 116 and a plurality of pony rods.

A plurality of stay rods 112 are disposed at least partially between the fluid end 104 and the power end of the pump. The stay rods 112 are disposed at least partially externally to the outer surface 111 of the fluid end body 105. A plurality of packing nuts 114 are disposed at least partially in bores formed in the outer surface 111 of the fluid end body 105. The packing nuts 114 each are in contact with a seal disposed around a corresponding one of the plungers 116 to form a seal between the respective plunger 116 and the fluid end body 105.

The fluid end apparatus 100 includes a plurality of lock assemblies 140 disposed between the packing nuts 114 and the plurality of stay rods 112 disposed above the packing nuts 114. The lock assemblies 140 are configured to prevent the packing nuts 114 from unthreading and backing out from the fluid end body 105.

Figure 1B:
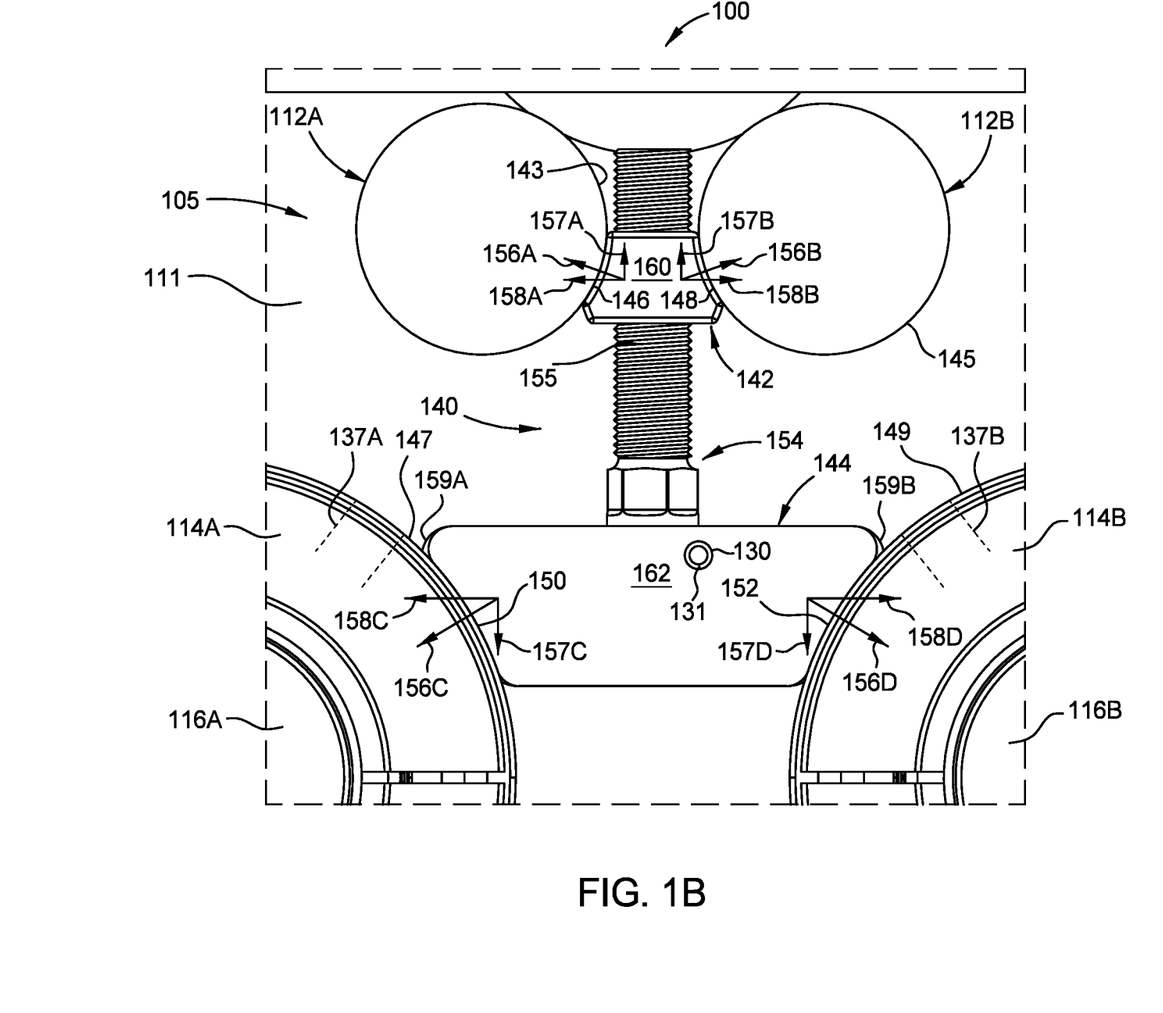
FIG. 1B is a schematic front view of one of the lock assemblies of the fluid end apparatus illustrated in FIG. 1A, according to one implementation.

FIG. 1B is a schematic front view of one of the lock assemblies 140 of the fluid end apparatus 100 illustrated in FIG. 1A, according to one implementation. The lock assembly 140 is disposed between a pair of stay rods (including a first stay rod 112A and a second stay rod 112B) and a pair of packing nuts (including a first packing nut 114A and a second packing nut 114B). Each packing nut 114A, 114B includes a plunger 116A, 116B disposed therethrough, respectively. The fluid end body 105 includes an outer surface 111. The pair of stay rods 112A, 112B, and the pair of packing nuts 114A, 114B are disposed at least partially externally to the outer surface 111 of the fluid end body 105.

The lock assembly 140 includes a first block 142 in contact with the pair of stay rods 112A, 112B. The lock assembly 140 includes a second block 144 in contact with the pair of packing nuts 114A, 114B. The first block 142 includes a first curved surface 146 in contact with an outer surface 143 of the first stay rod 112A. The first block 142 includes a second curved surface 148 in contact with an outer surface 145 of the second stay rod 112B. The second block 144 includes a first curved surface 150 in contact with an outer surface 147 of the first packing nut 114A, and a second curved surface 152 in contact with an outer surface 149 of the second packing nut 114B. The first block 142 is disposed between the pair of stay rods 112A, 112B and the second block 144 is disposed between the pair of packing nuts 114A, 114B.

In one embodiment, which can be combined with other embodiments, the first curved surface 146 includes a radius that is substantially the same as (such as within a 10% difference of) a radius of the outer surface 143. In one embodiment, which can be combined with other embodiments, the second curved surface 148 includes a radius that is substantially the same as (such as within a 10% difference of) a radius of the outer surface 145. In one embodiment, which can be combined with other embodiments, the first curved surface 150 includes a radius that is substantially the same as (such as within a 10% difference of) a radius of the outer surface 147. In one embodiment, which can be combined with other embodiments, the second curved surface 152 includes a radius that is substantially the same as (such as within a 10% difference of) a radius of the outer surface 149.

The present disclosure contemplates that other geometries other than the curved surfaces 146, 148, 150, 152 may be included on the first block 142 and/or the second block 144 to contact the pair of stay rods 112A, 112B and the pair of packing nuts 114A, 114B, respectively. As an example, the first block 142 and/or the second block 144 may include planar surfaces, edges, chamfers, and/or bevels to contact the pair of stay rods 112A, 112B and the pair of packing nuts 114A, 114B.

The present disclosure also contemplates that the first block 142 may be in contact with one of the stay rods 112A or 112B. In one embodiment, which can be combined with other embodiments, the first block 142 is disposed in contact with the first stay rod 112A and not the second stay rod 112B. The present disclosure also contemplates that the second block 144 may be in contact with one of the packing nuts 114A or 114B. In one embodiment, which can be combined with other embodiments, the second block 144 is disposed in contact with the first packing nut 114A and not the second packing nut 114B.

The lock assembly 140 includes a connector rod 154 disposed at least partially between the first block 142 and the second block 144. The connector rod 154 is connected to the first block 142 and the second block 144. The connector rod 154 includes a threaded outer surface 155. The first block 142 is disposed above the second block 144. The connector rod 154 is actuatable to move the first block 142 relative to the second block 144. In one example, the connector rod 154 is actuatable to move the first block 142 into engagement with the pair of stay rods 112A, 112B, and/or is actuatable to move the first block 142 out of engagement with the pair of stay rods 112A, 112B. The connector rod 154 is actuatable to apply locking forces 156A and 156B to the outer surface 143 of the first stay rod 112A and the outer surface 145 of the second stay rod 112B, respectively, using the first block 142. The connector rod is actuatable to apply locking forces 156C and 156D to the outer surface 147 of the first packing nut 114A and the outer surface 149 of the second packing nut 114B, respectively, using the second block 144.

Each of the locking forces 156A-156D defines a first vector 157A-157D and a second vector 158A-158D, respectively. The first vectors 157A-157D are in a vertical plane and the second vectors 158A-158D are in a horizontal plane. The second vector 158C of the locking force 156C applied to the outer surface 147 of the first packing nut 114A is in a horizontal direction opposite of the second vector 158D of the locking force 156D applied to the outer surface 149 of the second packing nut 114B, as illustrated in FIG. 1B. The second vectors 158C, 158D of the locking forces 156C, 156D bias the first packing nut 114A away from the second packing nut 114B in a horizontal direction. The present disclosure contemplates that the locking forces 156A-156D may bias the pair of stay rods 112A, 112B and the pair of packing nuts 114A, 114B without moving each of the pair of stay rods 112A, 112B and/or the pair of packing nuts 114A, 114B.

The first vectors 157A, 157B of the locking forces 156A, 156B applied to the pair of stay rods 112A, 112B, respectively, are in a vertical direction opposite of the first vectors 157C, 157D applied to the pair of packing nuts 114A, 114B (as illustrated in FIG. 1B).

The first block 142 includes a front surface 160 that faces away from the outer surface 111 of the fluid end body 105 and a back surface 161 (illustrated in FIG. 1D) that faces and contacts the outer surface 111. The second block 144 includes a front surface 162 that faces away from the outer surface 111 of the fluid end body 105 and a back surface 163 (illustrated in FIG. 1D) that faces and contacts the outer surface 111. The second block 144 includes a first lip 159A that protrudes from the first curved surface 150 and a second lip 159B that protrudes from the second curved surface 152. The first lip 159A is disposed between the first packing nut 114A and the outer surface 111 of the fluid end body 105. The second lip 159B is disposed between the second packing nut 114B and the outer surface 111 of the fluid end body 105.

Aspects of the lock assembly 140 described herein facilitate preventing the packing nuts 114A, 114B from backing out away from the fluid end body 105, facilitating prevention of premature failure of the fluid end apparatus 100. Aspects of the lock assembly 140 facilitate such benefits while reducing or eliminating changes to other components of the fluid end apparatus 100, such as the fluid end body 105 and/or the packing nuts 114A, 114B.

Aspects of the lock assembly 140 also facilitate such benefits without extending any portion of the lock assembly 140 into one or more openings 137A, 137B formed in the curved outer surface 147 of the first packing nut 114A or the curved outer surface 149 of the second packing nut 114B. An outer perimeter defined by the outer surfaces of the second block 144 of the lock assembly 140 is disposed outside of each outer perimeter defined by the outer surfaces of each of the pair of packing nuts 114A, 114B. Aspects of the lock assembly 140 hence facilitate modularity of the lock assembly 140 and the fluid end apparatus 100, ease of use, ease of maintenance, and reduced costs.

Figure 1C:
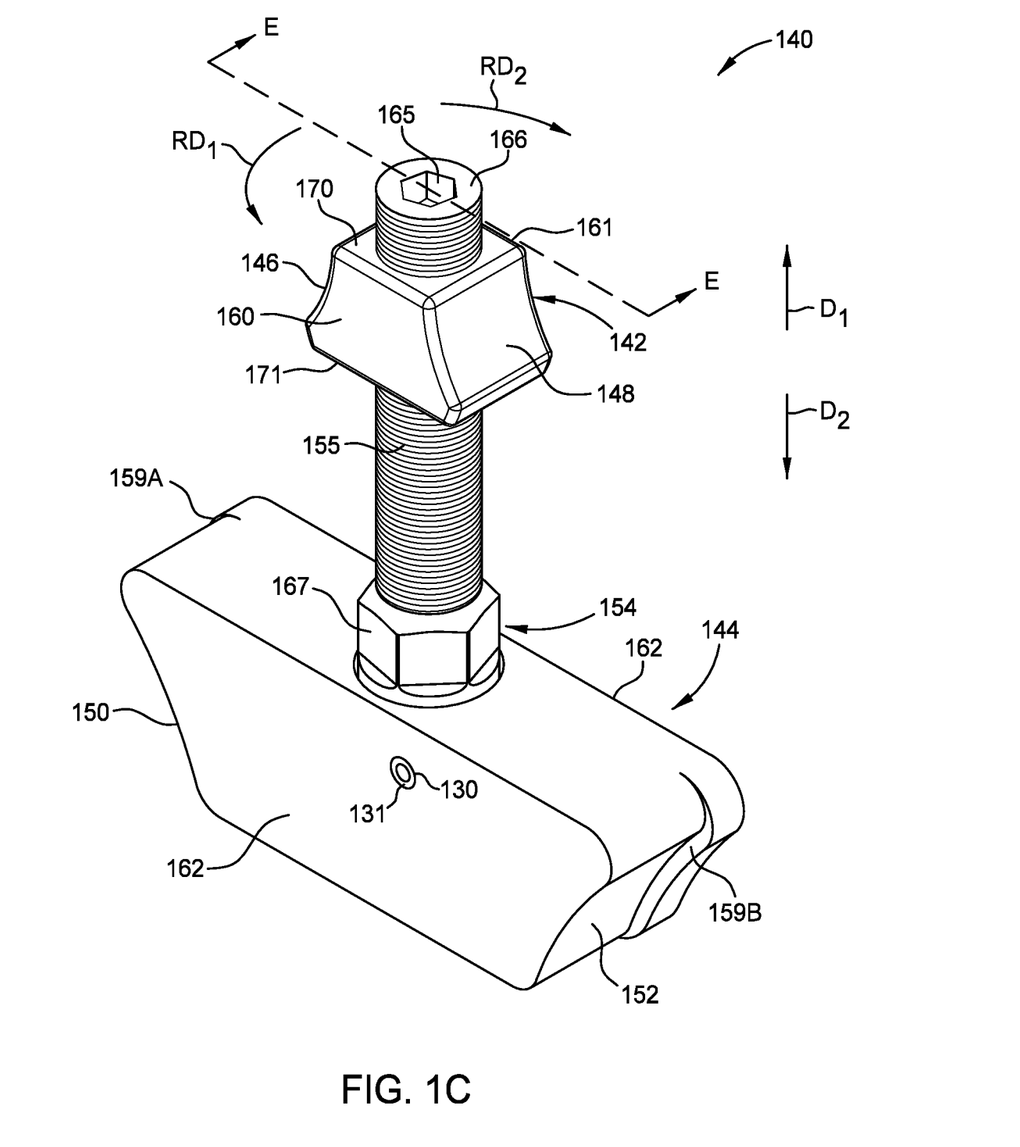
FIG. 1C is a schematic isometric front view of the lock assembly illustrated in FIG. 1B, according to one implementation.

FIG. 1C is a schematic isometric front view of the lock assembly 140 illustrated in FIG. 1B, according to one implementation. As discussed above, the connector rod 154 is actuatable to move the first block 142 relative to the second block 144. The connector rod 154 is an actuator. The connector rod 154 is actuatable by rotating the connector rod 154, such as in a first rotational direction $RD_1$ and/or in a second rotational direction $RD_2$ that is opposite of the first rotational direction $RD_1$. The connector rod 154 includes a torque head 165. Rotating the connector rod 154 in the first rotational direction $RD_1$ moves the first block 142 relative to the second block 144 upwards in a first vertical direction $D_1$ using threads of the threaded outer surface 155. Rotating the connector rod 154 in the second rotational direction $RD_2$ moves the first block 142 relative to the second block 144 downwards in a second vertical direction $D_2$ using threads of the threaded outer surface 155. Rotating the connector rod 154 in the first rotational direction $RD_1$ moves the first block 142 into engagement with the pair of stay rods 112A, 112B (illustrated in FIG. 1B). Rotating the connector rod 154 in the second rotational direction $RD_2$ moves the first block 142 out of engagement with the pair of stay rods 112A, 112B (illustrated in FIG. 1B).

In one embodiment, which can be combined with other embodiments, the second block 144 is placed in contact with the pair of packing nuts 114A, 114B. The connector rod 154 is then turned to rotate the connector rod 154 in the first rotational direction $RD_1$ to move the first block 142 upwards in the first vertical direction $D_1$ and into engagement with the pair of stay rods 112A, 112B. The fluid end apparatus 100 is then operated, for example to pump a frac fluid. After operation of the fluid end apparatus 100, the connector rod 154 is turned to rotate the connector rod 154 in the second rotational direction $RD_2$ to move the first block 142 downwards in the second vertical direction $D_2$ and out of engagement from the pair of stay rods 112A, 112B. The lock assembly 140 having the first block 142 and the second block 144 is then removed such that the second block 144 is out of engagement from the pair of packing nuts 114A, 114B. One or more of the pair of packing nuts 114A, 114B are removed from the fluid end body 105 and maintenance is conducted on the fluid end apparatus 100.

In one example, the torque head 165 is a recess formed in an upper end 166 of the connector rod 154. In one example, the torque head 165 includes a protrusion at the upper end 166 having an outer surface shaped to interface with a tool. The connector rod 154 includes a torque section 167 on an outer surface of the connector rod 154. The torque section 167 is disposed below the threaded outer surface 155 and between the threaded outer surface 155 and the second block 144. The torque section 167 is disposed between the first block 142 and the second block 144. The torque section 167 is sized and shaped to interface with a tool, such as a wrench.

The connector rod 154 is rotatable to actuate the connector rod 154 by turning the connector rod 154, such as by turning the torque head 165 and/or the torque section 167 using one or more tools, for example a wrench. The one or more tools may include a hex tool, an Allen wrench and/or an open end wrench.

Figure 1D:
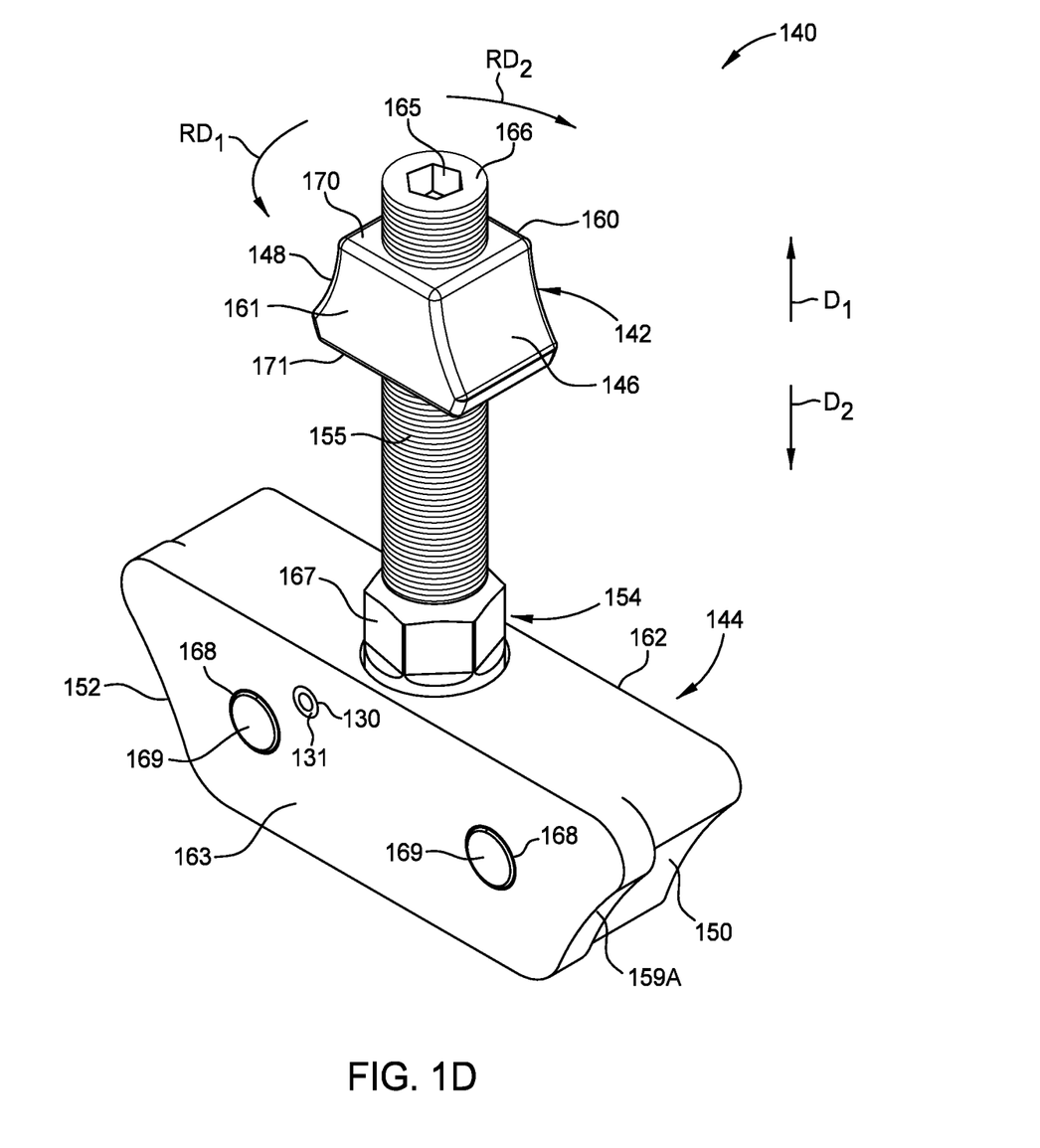
FIG. 1D is a schematic isometric back view of the lock assembly illustrated in FIG. 1C, according to one implementation.

FIG. 1D is a schematic isometric back view of the lock assembly 140 illustrated in FIG. 1C, according to one implementation. The second block 144 includes one or more openings 168 formed in the back surface 163. One or more magnets 169 are disposed in the one or more openings 168. The one or more magnets 169 facilitate maintaining the back surface 163 of the second block 144 into contact with the outer surface 111 of the fluid end body 105.

Figure 1E:
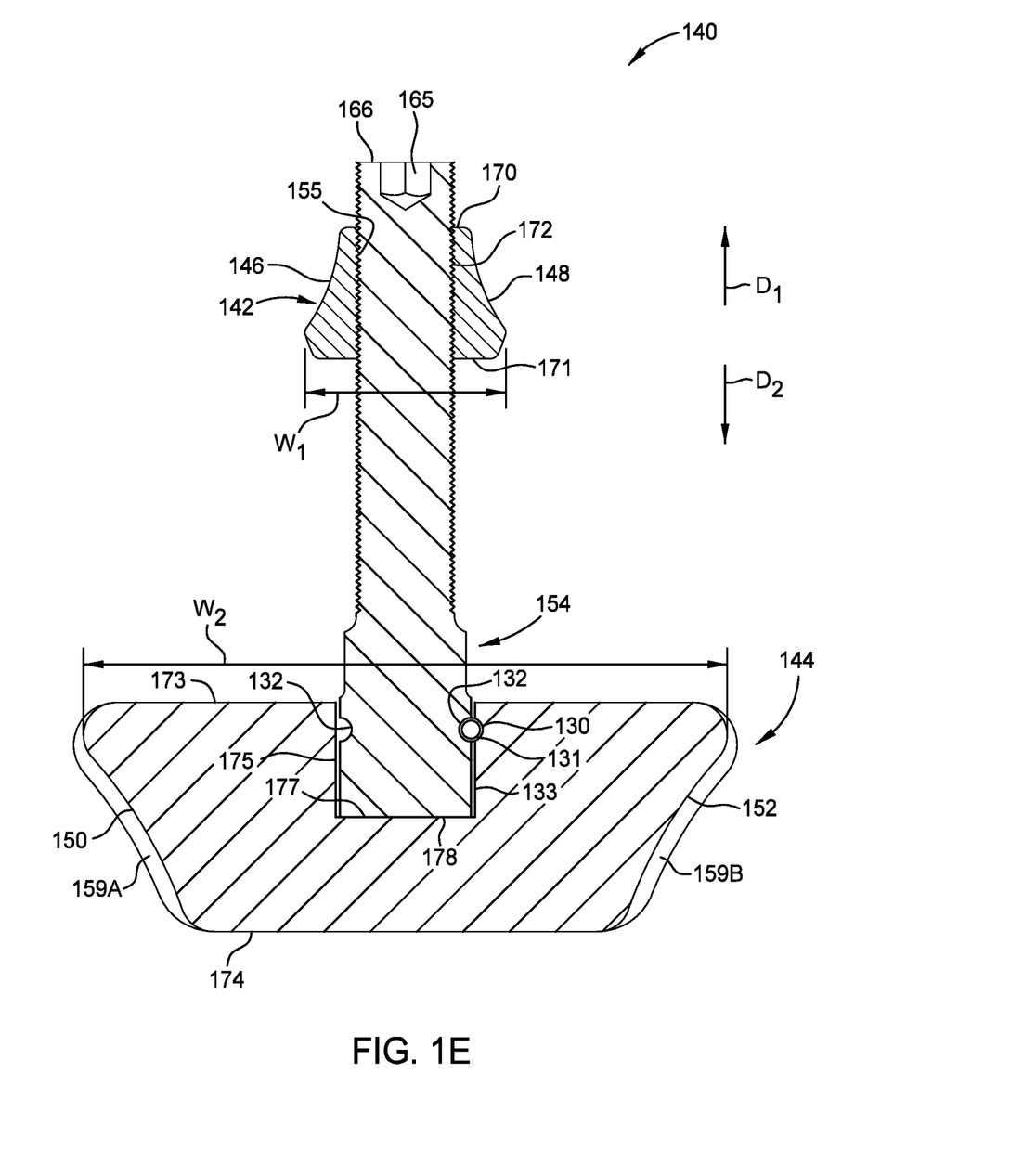
FIG. 1E is a schematic cross-sectional view of the lock assembly illustrated in FIGS. 1B-1D, taken along lines E-E in FIG. 1C, according to one implementation.

FIG. 1E is a schematic cross-sectional view of the lock assembly 140 illustrated in FIGS. 1B-1D, taken along lines E-E in FIG. 1C, according to one implementation. The first block 142 includes an upper outer surface 170 and a lower outer surface 171. The first block 142 includes a threaded inner surface 172 that extends from the upper outer surface 170 to the lower outer surface 171. The threaded outer surface 155 of the connector rod 154 interfaces with (and is threaded into) the threaded inner surface 172 of the first block 142. The second block 144 includes an upper outer surface 173 and a lower outer surface 174. The second block 144 includes a first recess 175 formed in the upper outer surface 173. A lower end 177 of the connector rod 154 is disposed in the first recess 175 and interfaces with a bottom surface 178 of the first recess 175. The first recess 175 defines the bottom surface 178 and a sidewall 133. The connector rod 154 includes a groove 132 formed into an outer surface of a lower portion of the connector rod 154. The groove 132 extends circumferentially about the connector rod 154. The groove 132 is between a first end and a second end of the connector rod 154.

The second block 144 includes a retainer opening 130 that extends from the front surface 162 to the back surface 163 of the second block 144. The second block 144 includes a retainer 131 disposed in the retainer opening 130. The retainer 131 may include one or more of a pin, a bolt, and/or a screw. In one example, the retainer 131 is a roll pin. The retainer opening 130 extends from the front surface 162, at least partially through the sidewall 133 of the first recess 175, and to the back surface 163. The retainer 131 is disposed into the retainer opening 130 and through a portion of the groove 132 formed in the connector rod 154. The retainer 131 is between the connector rod 154 and the sidewall 133 defined by the first recess 175.

The retainer 131 may create an interference fit between the connector rod 154 and the second block 144. The retainer 131 retains the connector rod 154 in the first recess 175 of the second block 144. For example, the retainer 131 prevents the connector rod 154 from moving upwards and out of the first recess 175. The connector rod 154 may be turned to rotate freely in the first rotational direction $RD_1$ or the second rotational direction $RD_2$ while being retained in the first recess 175.

A first width $W_1$ is defined between the first curved surface 146 (such as a lower end of the first curved surface 146) and the second curved surface 148 (such as a lower end of the second curved surface 148) of the first block 142. A second width $W_2$ is defined between the first curved surface 150 (such as an upper end of the first curved surface 150) and the second curved surface 152 (such as an upper end of the second curved surface 152) of the second block 144. The second width $W_2$ is larger than the first width $W_1$.

Figure 1F:
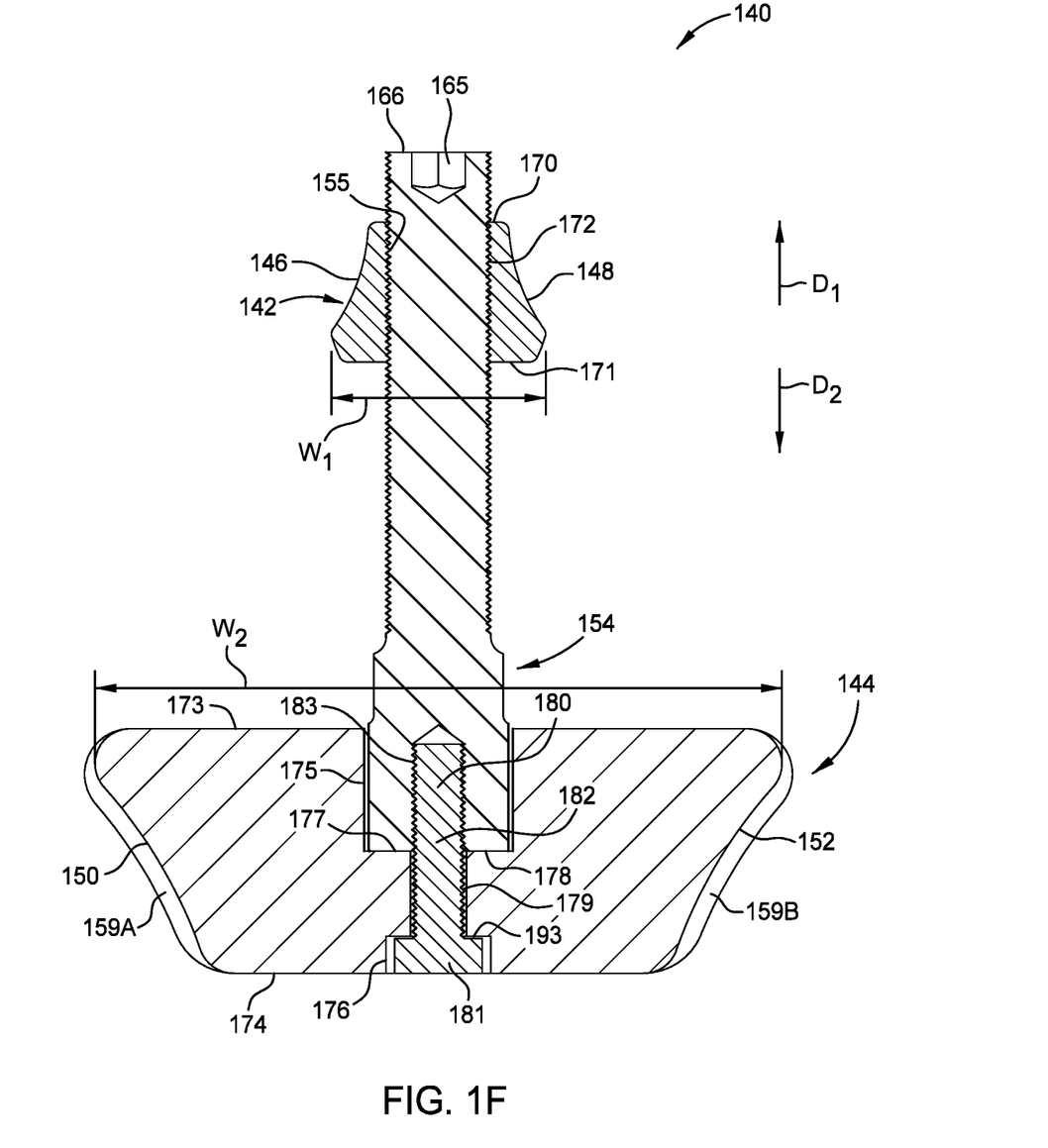
FIG. 1F is a schematic cross-sectional view of the lock assembly illustrated in FIGS. 1B-1D, taken along lines E-E in FIG. 1C, according to one implementation.

FIG. 1F is a schematic cross-sectional view of the lock assembly 140 illustrated in FIGS. 1B-1D, taken along lines E-E in FIG. 1C, according to one implementation. The implementation illustrated in FIG. 1F is similar to the implementation illustrated in FIG. 1E, and includes many of the same aspects. In the implementation illustrated in FIG. 1F, the second block 144 includes a second recess 176 formed in the lower outer surface 174. An opening 179 extends from the first recess 175 to the second recess 176. One or more retainers 180, such as a screw, pin, and/or a bolt, couple the connector rod 154 to the second block 144 through the opening 179. The retainer 180 includes a head 181 that interfaces with a shoulder 193 of the second recess 176 and a shaft 182 that interfaces with a recess 183 formed in the lower end 177 of the connector rod 154. The shaft 182 may have threads that are threaded into engagement with threads formed in the recess 183 of the connector rod 154. The retainer 180 and the connector rod 154, when coupled together, can rotate together relative to the second block 144 to move the first block 142 up or down along the threaded outer surface 155 of the connector rod 154. The retainer 180 retains the connector rod 154 at least partially in the first recess 175 of the second block 144.

Benefits of the present disclosure include reduced or eliminated probability of premature failure of fluid ends; reduced or eliminated probability of backing out of packing nuts without; design simplicity; ease of use and maintenance of fluid ends, packing nuts, and lock assemblies; promoted modularity of lock assemblies and fluid ends; reduced or eliminated changes to fluid ends; ease of use and maintenance of fluid ends and lock assemblies; low costs for fluid ends; and promoted reliability of fluid ends.

Aspects of the present disclosure include a lock assembly, a first block, a second block, and a connector rod. It is contemplated that one or more of these aspects (and aspects thereof) disclosed herein may be combined. Moreover, it is contemplated that one or more of these aspects may include some or all of the aforementioned benefits.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A fluid end apparatus, comprising:
   a fluid end body having an outer surface;
   one or more stay rods coupled to the fluid end body and disposed at least partially externally to the outer surface of the fluid end body;
   one or more packing nuts threadedly coupled to the fluid end body; and
   a lock assembly, the lock assembly comprising:
      a first block in contact with the one or more stay rods;
      a second block in contact with the one or more packing nuts; and
      a connector rod actuatable to move at least one of the first or second blocks relative to the other of the first or second blocks and into contact with the one or more stay rods or the one or more packing nuts.

2. The fluid end apparatus of claim 1, wherein:
   the one or more stay rods comprises a first stay rod and a second stay rod;
   the one or more packing nuts comprises a first packing nut and a second packing nut;
   a first curved surface of the first block is in contact with an outer surface of the first stay rod;
   a second curved surface of the first block is in contact with an outer surface of the second stay rod;
   a first curved surface of the second block is in contact with an outer surface of the first packing nut; and
   a second curved surface of the second block is in contact with an outer surface of the second packing nut.

3. The fluid end apparatus of claim 2, wherein a first width is defined between the first curved surface and the second curved surface of the first block, and a second width is defined between the first curved surface and the second curved surface of the second block, the second width being larger than the first width.

4. The fluid end apparatus of claim 2, wherein the connector rod is actuatable to apply a locking force to the outer surface of the first packing nut using the second block and a locking force to the outer surface of the second packing nut using the second block.

5. The fluid end apparatus of claim 4, wherein a vector of the locking force applied to the outer surface of the first packing nut is in a direction opposite of a vector of the locking force applied to the outer surface of the second packing nut.

6. The fluid end apparatus of claim 1, wherein the connector rod is disposed at least partially between the first block and the second block.

7. The fluid end apparatus of claim 6, wherein the connector rod comprises a threaded outer surface, and the connector rod is actuatable by rotating the connector rod.

8. The fluid end apparatus of claim 7, wherein the connector rod comprises a torque head, and the threaded outer surface of the connector rod interfaces with a threaded inner surface of the first block.

9. The fluid end apparatus of claim 8, wherein the threaded inner surface of the first block extends from an upper outer surface to a lower outer surface of the first block.

10. The fluid end apparatus of claim 9, wherein a lower end of the connector rod is disposed in a recess formed in an upper outer surface of the second block, and one or more retainers are disposed between the connector rod and the second block to retain the connector rod at least partially in the recess.

11. A fluid end apparatus, comprising:
   a fluid end body having an outer surface;
   one or more stay rods disposed at least partially externally to the outer surface of the fluid end body;
   one or more packing nuts; and
   a lock assembly, the lock assembly comprising:
      a first block comprising an upper outer surface, a lower outer surface, and a threaded inner surface that extends from the upper outer surface to the lower outer surface,
      a second block, and
      a connector rod disposed at least partially between the first block and the second block, the connector rod being actuatable to apply a locking force to the one or more packing nuts.

12. The fluid end apparatus of claim 11, wherein the connector rod is actuatable to apply a locking force to a first packing nut of the one or more packing nuts and a locking force to a second packing nut of the one or more packing nuts, and a vector of the locking force applied to the first packing nut is in a direction opposite of a vector of the locking force applied to the second packing nut.

13. The fluid end apparatus of claim 11, wherein the connector rod comprises a threaded outer surface, and the connector rod is actuatable by rotating the connector rod.

14. The fluid end apparatus of claim 13, wherein the connector rod comprises a torque head, and the threaded outer surface of the connector rod interfaces with the threaded inner surface of the first block.

15. The fluid end apparatus of claim 11, wherein a lower end of the connector rod is disposed in a recess formed in an upper outer surface of the second block.

16. The fluid end apparatus of claim 15, wherein one or more retainers retain the connector rod at least partially in the recess.

17. The fluid end apparatus of claim 11, wherein the connector rod is actuatable to move the first block relative to the second block.

18. The fluid end apparatus of claim 17, wherein:
the one or more stay rods comprises a first stay rod and a second stay rod;
a first curved surface of the first block is in contact with an outer surface of the first stay rod;
a second curved surface of the first block is in contact with an outer surface of the second stay rod;
a first curved surface of the second block is in contact with an outer surface of a first packing nut of the one or more packing nuts; and
a second curved surface of the second block is in contact with an outer surface of a second packing nut of the one or more packing nuts.

19. The fluid end apparatus of claim 18, wherein a first width is defined between the first curved surface and the second curved surface of the first block, and a second width is defined between the first curved surface and the second curved surface of the second block, the second width being larger than the first width.

20. A fluid end apparatus, comprising:
a fluid end body having an outer surface;
one or more stay rods disposed at least partially externally to the outer surface of the fluid end body;
one or more packing nuts; and
a lock assembly, the lock assembly comprising:
a first block,
a second block, and
a connector rod disposed at least partially between the first block and the second block, the connector rod being actuatable to apply a locking force to the one or more packing nuts, wherein the connector rod is actuatable to apply a locking force to a first packing nut of the one or more packing nuts and a locking force to a second packing nut of the one or more packing nuts, and a vector of the locking force applied to the first packing nut is in a direction opposite of a vector of the locking force applied to the second packing nut.

21. A fluid end apparatus, comprising:
a fluid end body having an outer surface;
one or more stay rods disposed at least partially externally to the outer surface of the fluid end body, the one or more stay rods comprising a first stay rod and a second stay rod;
one or more packing nuts; and
a lock assembly, the lock assembly comprising:
a first block, wherein a first curved surface of the first block is in contact with an outer surface of the first stay rod, and a second curved surface of the first block is in contact with an outer surface of the second stay rod,
a second block, wherein a first curved surface of the second block is in contact with an outer surface of a first packing nut of the one or more packing nuts, and a second curved surface of the second block is in contact with an outer surface of a second packing nut of the one or more packing nuts, and
a connector rod disposed at least partially between the first block and the second block, the connector rod being actuatable to apply a locking force to the one or more packing nuts and being actuatable to move the first block relative to the second block.

22. The fluid end apparatus of claim 21, wherein a first width is defined between the first curved surface and the second curved surface of the first block, and a second width is defined between the first curved surface and the second curved surface of the second block, the second width being larger than the first width.

\* \* \* \* \*